United States Patent [19]

Schultz

[11] 4,437,678
[45] Mar. 20, 1984

[54] VEHICULAR SUSPENSION

[76] Inventor: Barry J. Schultz, 738 Highbury Rd., Glen Waverley, Victoria 3150, Australia

[21] Appl. No.: 367,236
[22] PCT Filed: Jul. 31, 1981
[86] PCT No.: PCT/AU81/00102
  § 371 Date: Mar. 31, 1982
  § 102(e) Date: Mar. 31, 1982
[87] PCT Pub. No.: WO82/00445
  PCT Pub. Date: Feb. 18, 1982

[30] Foreign Application Priority Data

Aug. 6, 1980 [AU] Australia ............... PE4905

[51] Int. Cl.³ .............................. B62K 25/08
[52] U.S. Cl. ................... 280/276; 267/175; 267/177; 280/703
[58] Field of Search ............ 280/276, 703; 267/34, 267/615, 170, 175, 177, 60

[56] References Cited

U.S. PATENT DOCUMENTS

| 3,989,261 | 11/1976 | Kamaguchi | 280/276 |
| 4,159,105 | 6/1979 | Vander Laan et al. | 267/177 |
| 4,159,123 | 6/1979 | Petty | 280/703 |
| 4,295,658 | 10/1981 | Kashima | 280/703 |
| 4,367,882 | 1/1983 | Alexander et al. | 280/276 |

Primary Examiner—Robert R. Song
Attorney, Agent, or Firm—Cushman, Darby & Cushman

[57] ABSTRACT

A vehicle such as a motor cycle having at least one wheel and including a suspension (2) for resiliently mounting the wheel relative to the chassis. The suspension includes adjustment means (18, 12) which are operable to increase the resilient loading of the suspension when the brakes are applied in order to prevent "brake dive". In the preferred embodiment the suspension includes an actuating hydraulic cylinder (18) which is engaged and moved by the brake arm (27) of the brakes when the brakes are applied in order to pressurize the actuating hydraulic cylinder.

11 Claims, 3 Drawing Figures

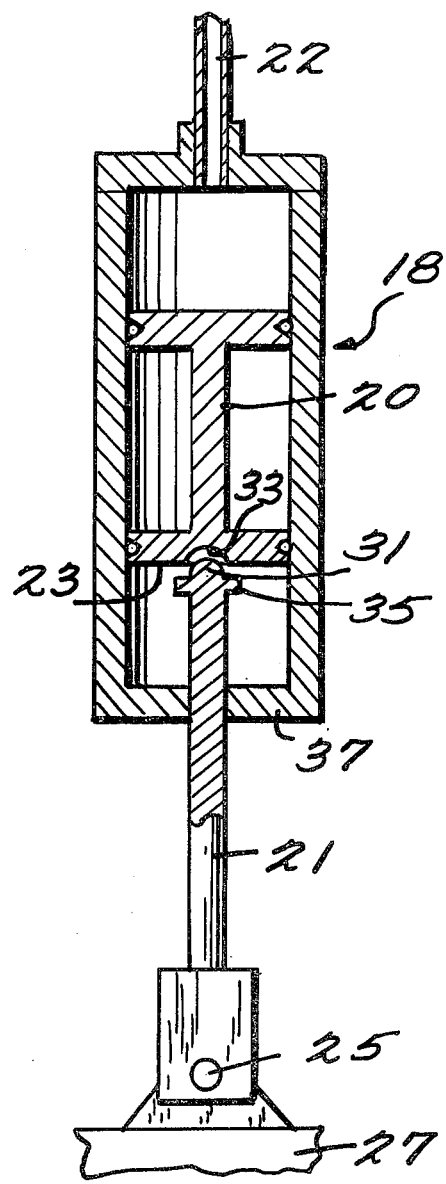
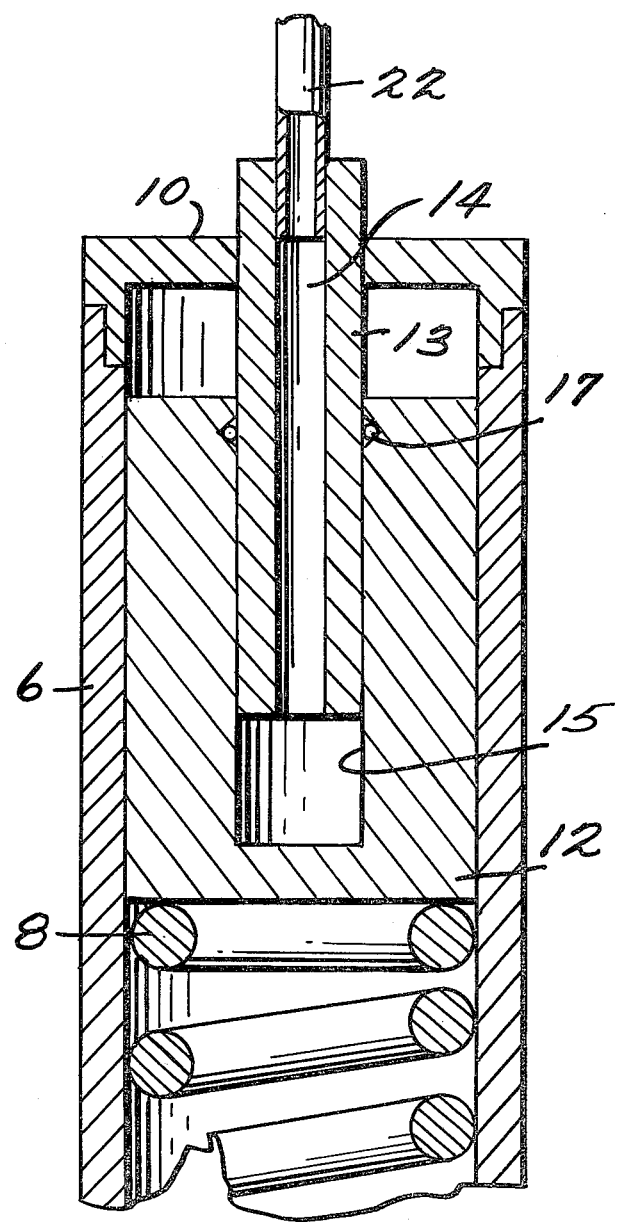

VEHICULAR SUSPENSION

The present invention relates to a vehicular suspension.

It is well known that the front suspension members of a vehicle become heavily loaded during brake applications. This compression or "dive" has the effect of reducing the effective suspension travel available to cope with road surface irregularities, of affecting the level attitude of the vehicle, and therefore affecting steering geometry.

The need to control this tendency has particular significance in short wheelbase vehicles where small suspension compressions acting over a short base produce more pronounced angles of dive or in vehicles with softly sprung long travel suspensions. It will be appreciated that suspension dive is therefore a particularly serious problem in motorcycle suspensions but is also a problem in other vehicles such as automobiles.

The object of the present invention is to provide a novel form of suspension which ameliorates the effect of suspension dive.

According to the present invention there is provided a vehicle comprising a chassis, at least one wheel, a suspension for resiliently mounting the wheel relative to the chassis, brake means for applying a braking torque to said wheel, suspension adjustment means coupled to said brake means and operable to increase resilient loading of the suspension when said brake means produces a braking torque on said wheel and means for transmitting at least part of the reaction torque to the braking torque to said adjustment means. In the arrangement defined above the suspension adjustment means are operated independently of any loading which might be applied to the suspension means in consequence of braking of the vehicle. Thus, the arrangement of the invention can be considered to increase the resistance of the suspension under vehicle braking to thereby effectively reduce suspension dive.

Preferably, the suspension includes a compression spring and said suspension adjustment means is operable to compress the spring.

Preferably further, the suspension includes a telescopic suspension strut having first and second tubular members telescopically coupled together with said compression spring therein and wherein said adjustment means is operable to adjust the compressive forces applied to said spring without affecting the relative positions of said first and second members.

Preferably further, said suspension adjustment means includes an actuating hydraulic cylinder arranged to be pressurized by reaction torques to said braking torque, said adjustment means including a piston located in the telescopic suspension strut, and hydraulic line being connected between said cylinder and the strut, the arrangement being such that variations of pressure within said cylinder causes the piston to move to thereby compress said spring.

The hydraulic system could have a facility for being pre-charged with hydraulic pressure so that no initial movement of the master cylinder is spent in bringing the system to operating pressure. Further, this facility could be employed to provide a means of adjusting the suspension pre-load, by pumping up the system to increase the initial spring pre-load.

Preferably further, the brake comprises a disc brake and the arrangement is such that said hydraulic cylinder is engaged by the brake caliper or pad in the disc brake. Where the brake comprises a drum brake the hydraulic cylinder is engaged by the brake shoes.

The invention will now be further described with reference to the accompanying drawings, in which:

FIGS. 2 and 3 are more detailed views of parts of the suspension shown in FIG. 1.

Figure 1:
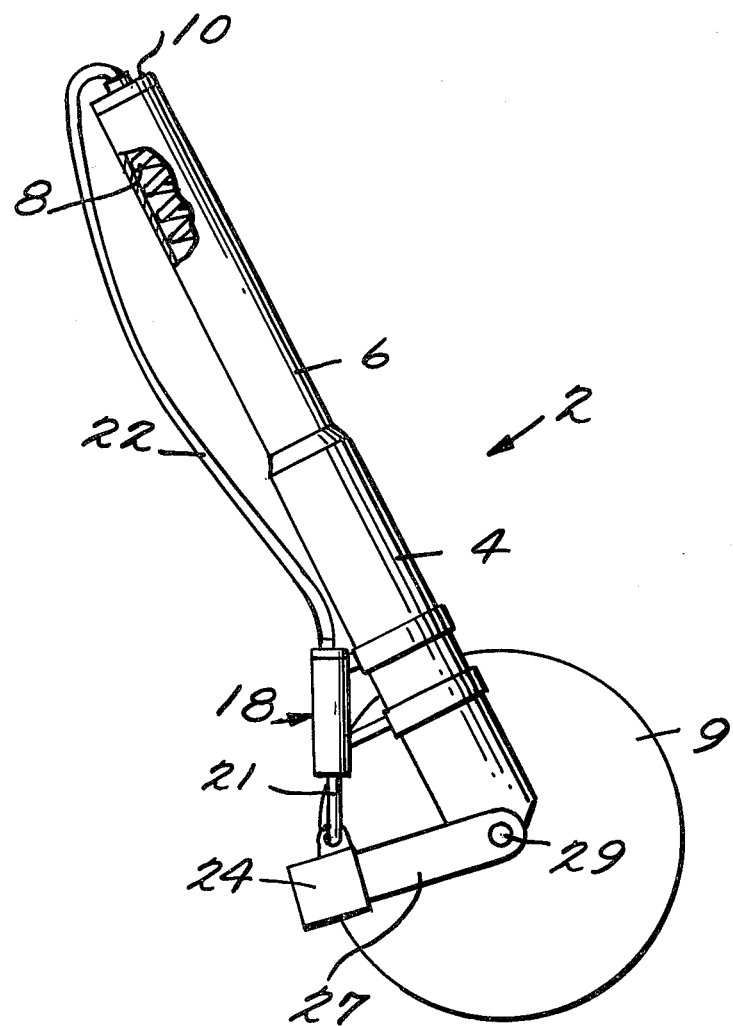
FIG. 1 is a schematic view of a front suspension and brake of a motorcycle.

FIG. 1 illustrates part of a suspension and brake system for a motorcycle. It comprises a telescopic suspension strut 2 comprising a lower tubular portion 4, the lower end of which is connected to the bearing assembly (not shown) for the wheel. The strut includes an upper tubular portion 6 which is telescopically mounted within the portion 4 and located within the portion 6 is a compression spring 8. Normally the upper end of the compression spring 8 bears against the lower face of a suspension strut cap 10 which is fixed in position in the top of the portion 6.

In accordance with the invention, a piston member 12 is interposed between the cap 10 and the spring 8, as best seen in FIG. 2, such that the spring 8 bears against the lower face of the piston. In this arrangement the cap 10 is formed with a projecting spigot 13 on its lower face, the spigot 13 including a fluid passage 14. The piston member 12 is of generally tubular shape and its opening 15 is of complementary shape to spigot 13. An O-ring seal 17 is formed in the opening to form a fluid seal against the spigot 13. The arrangement is such that when fluid pressure within the line 14 is sufficiently high to overcome the compressive force of the spring 8, the piston member 12 will move downwardly and compress the spring. If the suspension strut 2 is otherwise static, the downward movement of the piston member 12 and compression of the spring 8 occurs independently of any relative movement of the portions 4 and 6 of the strut. Thus, movement of the piston 12 effectively alters the "stiffness" of the suspension.

Returning now to FIG. 1 it will be seen that the arrangement includes an actuating hydraulic cylinder 18 connected to the lower portion 4 of the strut and having a movable piston 20 slidably mounted therein. A piston rod 21 is connected to or located adjacent to the lower face 23 of the piston 20. Movement of the rod 21 causes movement of the piston 20. An hydraulic line 22 extends from the cylinder 18 to connect with the line 14 through the cap 10. The rod 21 is located so that it is moved when the brakes of the cycle are applied.

In the illustrated arrangement, the lower end of the rod 21 is pivotally connected by pivot coupling 25 to the brake arm 27 upon which the disc brake caliper 24 is mounted. Brake pads (not shown) are carried by the caliper 24 and engage a brake disc 9 on application of the brakes of the cycle. Contrary to normal practice, the arm 27 is mounted such that it can undergo limited rotational movement about the axle 29 of the cycle. When the brakes are applied, the arm 27 moves, in the direction towards the piston 20, and this movement is resisted by build up of fluid pressure in the cylinder 18 acting through the rod 21. Thus the reaction force required for braking is transmitted through the rod 21 and thus increases greatly the pressure within the cylinder 18 and so compresses the spring 8 directly corresponding to applied braking torques. The upper end 31 of the rod 21 is rounded and is received within a rounded cavity 33 in the lower face 23 of the piston 20 so that the inter-engaging faces can tolerate relative rotation which is required in the geometry of the arrangement. The rod 21 is provided with a collar 35 which is engageable with the lower wall 37 of the cylinder 18 and so limits downward movement of the rod 21 and thus the arm 27.

The amount of compression of the spring 8 will of course depend on the type of motorcycle and its suspension. Normally the compression would vary from said 30 to 120 mm in response to maximum braking torques; a prototype with a stroke of 45.5 mm has been tested and found to be satisfactory. It would be possible, by providing a means of adjustment at the piston 20 to vary the length of stroke, to control the amount of spring compression desired. The bore and stroke of the master cylinder are in one prototype 15 mm and 40 mm respectively. The hydraulic ratio between the master cylinder and the two slave cylinders is 1.125:1 and this has functioned satisfactorily. The peak pressure developed was about 2700 psi and a precharge pressure of 270 psi.

The advantages of the suspension of the invention include:

1. Adjustability:

By limiting the stroke of the master cylinder by a mechanical stop or adjuster, the amount of pre-load input into the spring can be varied infinitely from zero compensation to the full "dive" compensation designed into the system. Therefore the suspension can be adjusted to the particular requirements of a road or race situation.

2. Fail-Safe Operation:

In the event of any failure in the "anti-dive" system, the motorcycle suspension will continue to perform normally except that no dive compensation will operate and "dive" will occur. No serious effect on the safe operation of the suspension is possible with a failure in this system of anti-dive.

3. Roadholding and Stability:

This system incorporates all the features which make "anti-dive" technically desirable. In addition, the particular method of achieving this result means that the suspension retains its intended compliance and travel to accommodate suspension deflections over road surface irregularities. In this system neither the spring rate, nor the compression damping characteristics, which control the resistance to suspension deflection, are affected in any way. Then suspension is not stiffened, rather the additional load is cancelled out by increased pre-load.

4. Ease of Application:

To avoid major design changes to standard telescopic forks it is intended to locate the hydraulic slave piston 12 within the internal diameter cavity of the coil spring 8. The only limitation to this which may be experienced is that with smaller diameter fork tubes it may not be possible to allow sufficient wall thickness in the slave cylinder to withstand the high hydraulic line pressure operating in the system. However, no difficulty should arise with fork tubes of over 35 mm φ.

5. Independent from Braking System:

The device is entirely separate from the hydraulics of the braking system. No fault in the "anti-dive" system can therefore interfere with the safe operation of the brake system. Servicing and maintenance is also simplified in that both systems can be treated individually.

6. Suitable for Various Applications:

The system is readily adaptable to all front brake system variants including Twin Disc Brakes, Single Disc Brake, Drum Brake with single backing plate and Drum Brake with twin backing plates.

Many modifications of course will be readily apparent. For instance, the piston 12 could be located at the lower end of the suspension strut and still have the same effect. Further, the whole arm 27 need not be located in a movable mounting, it being sufficient for the brake pads to be movable. Further, it would be possible to arrange for the adjustment to be made by a mechanical linkage although the hydraulic arrangement is seen to be simpler to implement. The cylinder 18 and piston 21 could be extended rather than compressed and still arranged to produce the same effect.

The same effect could be achieved in an air suspension system.

Many further modifications will be apparent to those skilled in the art.

I claim:

1. A vehicle comprising a chassis: at least one wheel; a suspension including a telescopic suspension strut having first and second members telescopically coupled together and a compression spring mounted to resiliently resist inwardly telescopic movement of said members, the first member being connected to the chassis and the second member having said wheel connected thereto for rotation relative thereto; disc brake means for applying braking torque to said wheel and comprising a disc mounted for rotation with said wheel and a disc brake caliper unit, said unit being mounted on an arm pivotally connected to the suspension strut at the axis of rotation of the wheel; and suspension adjustment means comprising a first hydraulic piston and cylinder unit coupled between the second member of the suspension strut and the caliper unit or arm and arranged to pressure hydraulic fluid in the first hydraulic piston and cylinder unit proportionately to the braking torque applied by said brake means to said wheel, said suspension adjustment means including a second hydraulic piston and cylinder unit which is operable to compress said spring only in response to increased pressure in said hydraulic fluid generated in response to braking torques being applied to said wheel, and wherein, when there is no braking torque applied by said brake means to said wheel, flexure of the suspension does not cause variations in the pressure of hydraulic fluid.

2. A vehicle as claimed in claim 1 wherein said hydraulic fluid is precharged to a predetermined pressure.

3. A vehicle as claimed in claim 2 wherein said predetermined pressure is about 270 psi and wherein the peak pressure developed in said fluid is about 2700 psi.

4. A vehicle as claimed in claim 1 wherein the maximum stroke of the suspension adjustment means is in the range of 30 to 120 mm.

5. A vehicle as in claim 1 wherein said spring biases the piston of said second piston and cylinder unit into engagement with an abutment to thereby prevent said variations in the pressure in the hydraulic fluid, and, upon application of braking torques to said wheel, the piston moves away from the abutment and compresses said spring.

6. A vehicle as in claim 1 wherein the vehicle comprises a motocycle and said wheel comprises the front wheel thereof.

7. A vehicle comprising a chassis; at least one wheel; a suspension including a telescopic suspension strut having first and second members telescopically coupled together and a compression spring mounted within the first member to resiliently resist inwardly telescopic movement of said members, the first member being connected to the chassis and the second member having said wheel connected thereto for rotation relative thereto; brake means for applying braking torque to said wheel; and suspension adjustment means comprising a first hydraulic piston and cylinder unit coupled between the second member of the suspension strut and the brake means and arranged to pressure hydraulic fluid in the first hydraulic piston and cylinder unit proportionately to the braking torque applied by said brake means to said wheel, sad suspension adjustment means including a second hydraulic piston and cylinder unit located within the first member, said second unit and being operable to compress said spring only in response increased pressure in said hydraulic fluid generated in response to braking torques being applied to said wheel.

8. A vehicle as in claim 7 wherein the vehicle comprises a motocycle and said wheel comprises the front wheel thereof and wherein the first member of the suspension strut includes an abutment member against which the piston of said second piston and cylinder unit is biased by said spring, and, upon the application of braking torques to said wheel, the piston moves away from the abutment member and compresses said spring.

9. A vehicle as in claim 8 wherein the abutment member extends into a recess within the piston of said second piston and cylinder unit.

10. A vehicle comprising a chassis; at least one wheel; a suspension including a telescopic suspension strut having first and second members telescopically coupled together and a compression spring mounted within the first member to resiliently resist inwardly telescopic movement of said members, the first member being connected to the chassis and the second member having said wheel connected thereto for rotation relative thereto; disc brake means for applying braking torque to said wheel and comprising a disc mounted for rotation with said wheel and a disc brake caliper unit and pads for engaging the disc, said unit or pads being mounted for at least limited movement circumferentially relative to the disc; and suspension adjustment means comprising a first hydraulic piston and cylinder unit coupled between the second member of the suspension strut and the brake means and arranged to be engaged by said caliper unit or pads to pressurize hydraulic fluid in the first hydraulic piston and cylinder unit proportionately to the braking torque applied by said brake means to said wheel, said suspension adjustment unit including a second hydraulic piston and cylinder unit located within the first member of said second unit and being operable to compress said spring only in response to increased pressure in said hydraulic fluid generated in response to braking torques being applied to said wheel.

11. A motocycle comprising a frame and front and rear wheels; a front suspension having at least one compression spring therein for resiliently connecting the front wheel to the chassis; brake means for applying braking torque to the front wheel; and an hydraulically operable suspension adjustment means which is operable to compress said spring only in response to increased pressure in said hydraulic fluid generated in response to braking torques being applied to front wheel, and wherein, when there is no braking torque applied by said brake means to the front wheel, flexure of the front suspension does not cause variations in the pressure of the hydraulic fluid.

* * * * *